Dec. 3, 1957 G. C. WATERS, JR 2,815,224
AUTOMATIC RELEASABLE SAFETY COUPLING
FOR TRACTOR-TRAILER VEHICLES
Filed Sept. 6, 1956 2 Sheets-Sheet 1

INVENTOR
George C. Waters, Jr.
BY W. N. Rambo
ATTORNEY

Dec. 3, 1957
G. C. WATERS, JR
2,815,224
AUTOMATIC RELEASABLE SAFETY COUPLING
FOR TRACTOR-TRAILER VEHICLES
Filed Sept. 6, 1956
2 Sheets-Sheet 2
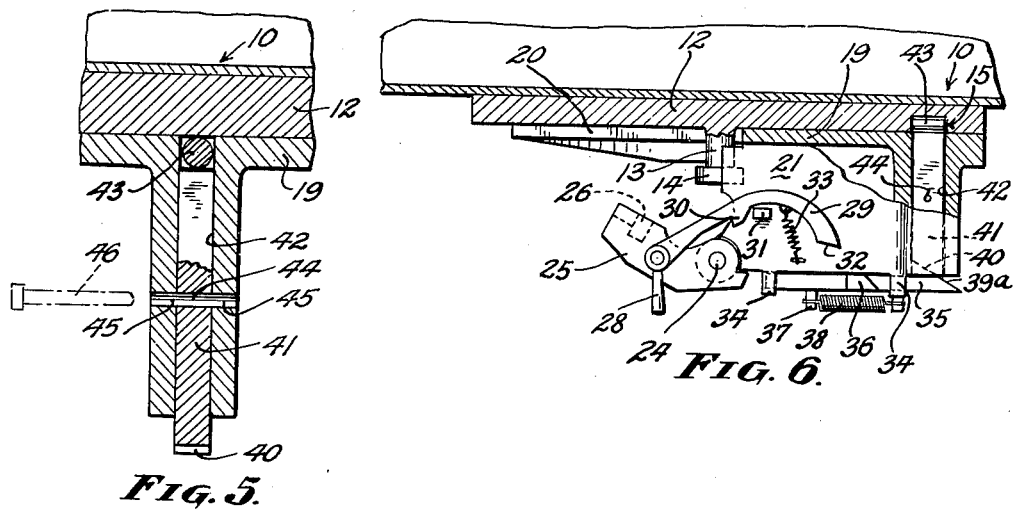
FIG. 5.
FIG. 6.
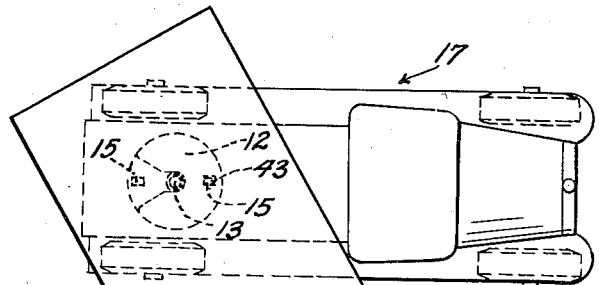
FIG. 7.
INVENTOR
George C. Waters, Jr.
BY *W. S. Rambo*
ATTORNEY United States Patent Office 2,815,224
Patented Dec. 3, 1957

2,815,224

AUTOMATIC RELEASABLE SAFETY COUPLING FOR TRACTOR-TRAILER VEHICLES

George C. Waters, Jr., Grove City, Ohio

Application September 6, 1956, Serial No. 608,310

5 Claims. (Cl. 280—432)

The present invention relates to couplings for tractor-trailer vehicles of the type embodying the usual fifth wheel and king pin connection members.

Present day tractor-trailer vehicles generally comprise a trailer component carrying on the forward under portion thereof a circular bearing plate and a depending king pin which are adapted to be received and supported by and upon a so-called slotted fifth wheel carried upon the tractor component. Ordinarily, the tractor component has associated with the fifth wheel thereof a suitable coupling device which is adapted to rotatively receive and hold the king pin component of the trailer when the tractor and trailer are united in towing relationship. The usual coupling device associated with tractor-trailer vehicles provides means for automatically locking the king pin of the trailer as the tractor component is backed into engagement with the trailer vehicle, but in order to release the coupling device from its locked engagement with the king pin, it is necessary that the operator of the vehicle or attendant personnel, effect such release manually in order that the tractor and trailer components may be disengaged from one another.

Highway accidents involving tractor-trailer vehicles are not uncommon, and one of the most serious hazards facing truck drivers of today is that resulting from a "jackknife" condition or position between the tractor and trailer components of the vehicle. Such "jackknife" condition usually results from a relative skidding between the tractor and trailer components such as might be caused by attempts to brake on a slippery road surface, or from collision of the tractor and/or trailer component with another object.

In a "jackknife" condition, the tractor component occupies a relatively extreme angular position relative to the trailer component, ranging, say from 90° to 120°, and when such condition or position is attained, the forward inertia of the trailer component together with its cargo is ordinarily sufficient to swing the tractor component back into the side of the trailer component, thus crushing the cab of the tractor and possibly seriously injuring or killing the driver of the vehicle.

Accordingly, it is the primary object of the present invention to provide a safety coupling for tractor-trailer vehicles which will function automatically in response to the attainment of a predetermined or given angular position between the tractor and trailer components of the vehicle to uncouple or release the trailer component from the tractor component to thereby prevent "jackknifing" between the components of the vehicle and the ensuing hazards ambient to such condition.

Another object of the present invention is to provide a safety coupling of this character which may be readily installed upon and used in connection with standard types of tractor-trailer vehicles in present day use without material modification to the usual fifth wheel, bearing plate and king pin components of such vehicles.

A further object of the invention is to provide a coupling for tractor-trailer vehicles which is relatively simple in its construction, and which is comprised of but relatively few operating parts which function efficiently to accomplish the desired automatic release or uncoupling of the trailer component in the event of an undesired attainment of a predetermined angular relation between the tractor and trailer components of the vehicle.

For a further and more detailed understanding of the present invention and the various additional objects and advantages accomplished thereby, reference is made to the following description and the acompanying drawings, wherein:

Fig. 5 is an enlarged transverse vertical sectional view taken along the line 5—5 of Fig. 1;

Fig. 6 is a longitudinal vertical sectional view similar to Fig. 1 showing the present coupling in an automatically unlocked position; and Fig. 7 is a diagrammatic top plan view showing the relative angular position between the tractor and trailer components of the vehicle as the same reach or approach a "jackknife" condition.

Figure 1:
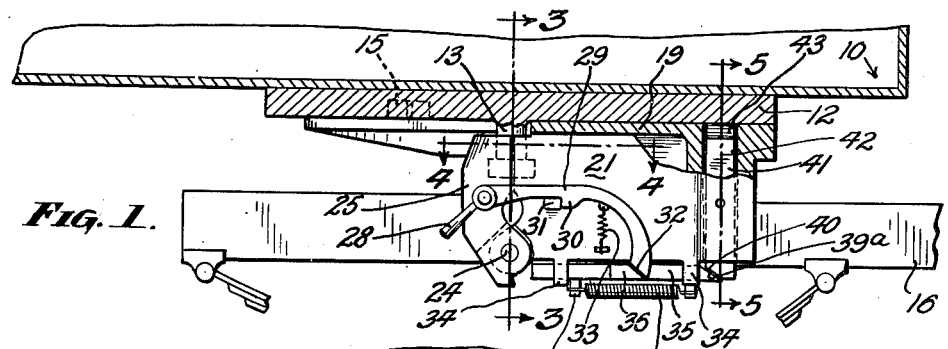
Fig. 1 is a longitudinal vertical sectional view taken through a safety coupling formed in accordance with the present invention and showing the coupling in a locked position.
Figure 2:
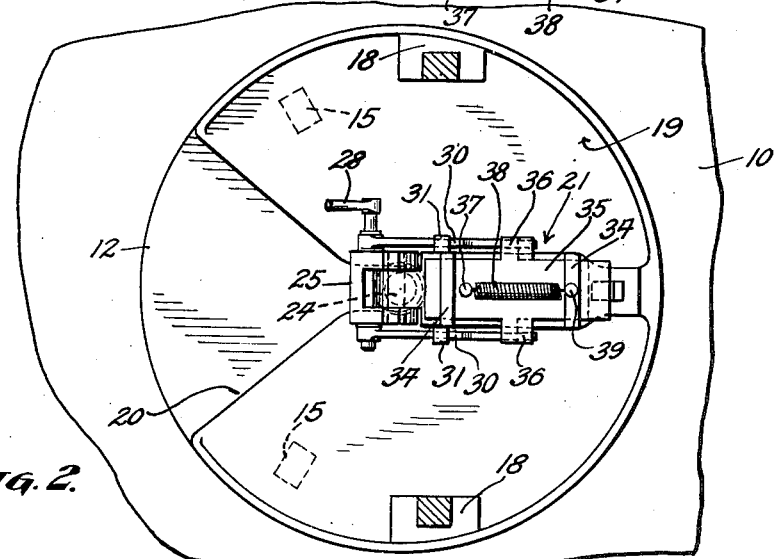
Fig. 2 is a bottom plan view of the coupling.
Figure 3:
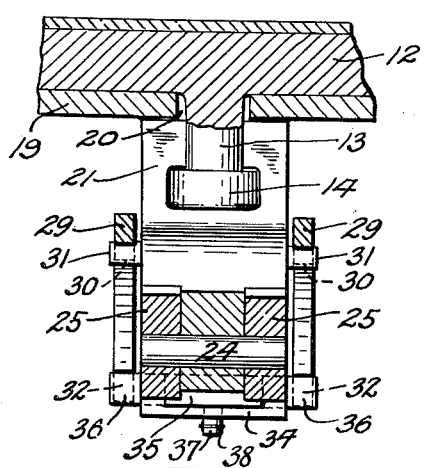
Fig. 3 is an enlarged transverse vertical sectional view taken along the line 3—3 of Fig. 1.
Figure 4:
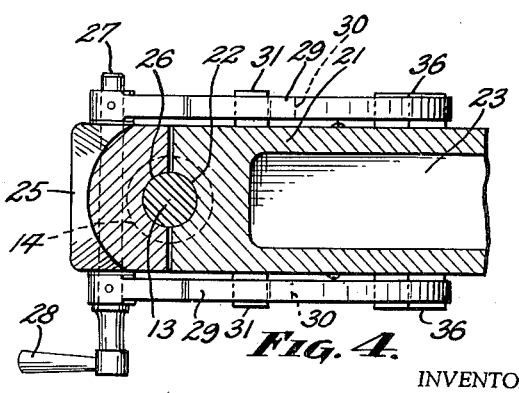
Fig. 4 is an enlarged horizontal sectional view taken along the line 4—4 of Fig. 1.

Referring now to the drawings, the numeral 10 designates generally the body of a trailer which, in the usual manner, is provided toward its rearward end with ground wheels 11, and toward its forward under portion with a circular bearing plate 12. Depending from the central under surface of the bearing plate 12 is the usual king pin 13 formed at its lower end with a diametrically enlarged retaining head 14. Additionally, the bearing plate 12 of the trailer vehicle is formed toward the outer edge thereof with a pair of peripherally spaced slots 15 of a depth to extend substantially inwardly of the thickness of the bearing plate 12 from the lower or bearing surface thereof. The slots or sockets 15, as will hereinafter be more fully explained, are located in a predetermined angular relation to the longitudinal axis of the trailer vehicle, corresponding to a relatively extreme angle which might be attained between the axes of the tractor and trailer components when the vehicle approaches a dangerous "jackknifing" condition.

The numeral 16 designates generally the frame or chassis of the tractor component 17 of the vehicle, and mounted for limited tilting movement upon the usual trunnion-type bearing supports 18 carried by the chassis 16 is a fifth wheel 19 formed at its rearward side with the usual segmental slot 20 to receive the king pin 13 of the trailer component. The triangular configuration of the slot 20 of the fifth wheel, in the usual manner, facilitates the coupling and uncoupling of the trailer and tractor components and serves to insure accurate alignment of the king pin 13 with the coupling mechanism hereinafter to be described.

In accordance with the present invention, there is provided a safety coupling for releasably locking the king pin 13 in its desired position within the inner end of the slot 20 of the fifth wheel, in order to effect a towing engagement between the tractor and trailer components. Toward this end, the present coupling comprises a first relatively stationary section 21 which may take the form of a metal casting welded or otherwise suitably secured to the under portion of the fifth wheel 19 immediately ahead of the central portion of the king pin-receiving slot 20. The rearward wall or edge portion of the stationary coupling section 21 is arcuately recessed, as at 22, and is complementally shaped to receive the shank portion of the king pin 13 and a portion of its enlarged head 14. Advantageously, the relatively heavy stationary section 21 of the coupling may be hollowed out in its intermediate region, as at 23, to lighten the casting and to conserve the weight load on the tractor vehicle. The lower rearward corner of the stationary section 21 of the coupling has pivotally connected thereto, as by means of the pivot pin 24, a complemental movable coupling section or latch 25 in the form of a falling block, the latter being formed on its inner side surface with appropriate recesses 26 complemental to the recesses 22 formed in the rearward edge of the stationary section 21, whereby to define a substantially enclosed socket for the rotative reception of the king pin 13 when the relatively movable section 25 of the coupling occupies its closed or locking position as illustrated in Fig. 1.

Extending through the intermediate body portion of the movable coupling section 25 is a horizontally disposed rotatable crank pin or shaft 27 provided at one end with a manually operable handle lever 28. Carried upon the crank shaft 27, an either side of the movable coupling section 25 are a pair of forwardly extending locking arms 29. The arms 29 extend forwardly alongside of the stationary section 21 of the coupling and are formed in their intermediate regions with depending hook-like bosses or lugs 30 which are adapted to engage and be held by a pair of laterally and outwardly extending catches or stops 31 formed or otherwise provided on the relatively stationary coupling section 21. The forwardly extending end portion of each of the arms 29 is curved forwardly and downwardly and terminates in a beveled end face 32 normally positioned adjacent the bottom or lower surface of the stationary coupling section 21. Contractile springs 33 are connected at one end thereof on either side of the stationary coupling section 21 and have their opposite ends connected with the intermediate portion of the locking arms 29 slightly in advance of the hook-like lugs 30. Thus, it will be seen that the springs 33 serve to resiliently urge and hold the arms 29 downwardly to insure against accidental disengagement between the lugs 30 and catches 31.

Slidably mounted in guide straps 34 which depend from the under side of the stationary section 21 is a bar-shaped lever 35 which is provided on either side thereof and in its intermediate region with a pair of laterally outwardly extending beveled cams 36 adapted to abut and engage the cooperatively beveled end surfaces 32 of the locking arms 29.

The slide lever 35 is provided on its under side with a depending pin or stud 37 to which is connected one end of a coiled contractile spring 38 having its opposite end stationarily connected with a stud 39 formed on the forwardly disposed strap 34. The spring 38 is arranged to resiliently urge the slide lever 35 in a forward direction, or to the right as viewed in Fig. 1. As will be noted by reference to Figs. 1 and 6, the forward end of the slide lever 35 is formed with a beveled cam shaft 39a arranged in engagement with the cooperatively beveled lower end surface 40 of a slidable dog 41 positioned within a vertical passage 42 formed in the forward portion of the stationary coupling section 21. The passage 42, at the upper end thereof extends through the forward portion of the fifth wheel 19 and terminates flush with the upper bearing surface of such fifth wheel. Also positioned within the passage 42 in abutting engagement with the upper end of the dog 41 is an antifriction roller 43 whose upper surface is arranged to bear against the under surface of the bearing plate 12 of the trailer component when the latter is united in towing engagement with the tractor component. Advantageously, as shown in Fig. 5 of the drawings, the dog 41 is formed in its intermediate region with a pin-receiving bore 44 adapted to register with corresponding pin-receiving openings 45 formed in the side walls of the stationary coupling section 21, whereby a locking pin 46 may be manually inserted through the openings 44 and 45 to lock the dog 41 and roller 43 against upward movement within the passage 42.

Thus, it will be seen that when the falling block or movable coupling section 25 occupies its king pin-engaging or closed position, as shown in Fig. 1, and with the bearing plate 12 of the trailer vehicle supported on the upper surface of the fifth wheel 19, the contractile spring 38 serves to resiliently urge the slide lever 35 forwardly, thus transmitting an upwardly directed force upon the slidable dog 41 and roller bearing 43, through the interengaging beveled surfaces 39a and 40. However, the dog 41 and roller 43 are normally prevented from moving upwardly within the passage 42 by engagement of the roller 43 with the underside of the bearing plate 12, and thus, the locking arms 29 are maintained in locked engagement with the catches 31 to prevent opening movement of the falling block or movable coupling section 25.

In operation, assuming that the trailer and tractor components are coupled together in towing relationship, as shown in Fig. 1, with the falling block 25 closed and locked, and with the removable locking pin 46 removed from the openings 44 and 45, the coupling securely unites the trailer vehicle with the tractor component with towing forces being absorbed through the hook-like projection 30 of the locking arms 29 and the relatively stationary catch 31. However, in the event that the trailer component should assume a given, relatively extreme angular relation to the tractor component, such as typified in Fig. 7 of the drawings, one of the slots 15 formed in the under side of the bearing plate 12 will move into registry with the upper end of the passage 42, thus permitting the roller 43 and the sliding dog 41 to move relatively upwardly, as shown in Fig. 6, thus disengaging the beveled face 40 from the cooperatively beveled face 39a of the slide lever 35, thereby permitting the slide lever 35 to snap forwardly under action of the spring 38. Such forward movement of the slide lever 35 causes the beveled face of the cams 36 to strike the cooperatively beveled surface 32 formed on the ends of the locking arms 29, to raise the locking arms 29 and the hook-like projections 30 against the action of the relatively light springs 33 to thereby cause the falling block or movable coupling section 25 to swing downwardly by gravity to a releasing position as shown in Fig. 6. Thus, assuming that the tractor and trailer components are in motion at the time of the automatic release of the movable coupling section 25, the inertia of the trailer component reacts through the king pin 13 against the surfaces of the fifth wheel which defines the segmental slot 20 in a manner to cause the trailer component to be quickly freed from engagement with the fifth wheel and the associated tractor component. It will here be understood that the usual tractor-trailer vehicle provides for the automatic setting of the brakes of the trailer component upon disengagement of the fluid conducting brake hoses or tubes which normally extend between the trailer component and the tractor component for the purpose of supplying pressure fluid to the wheel brakes of the trailer component. Thus, as the trailer is released automatically from the tractor, the associated braking hoses or conduits, not shown, will be broken or severed to set automatically the brakes associated with the trailer component thus causing the trailer to stop in a comparatively short space.

It will thus be seen that the present invention provides a mechanically efficient coupling for tractor-trailer vehicles which is characterized by its ability to effect the automatic release of the trailer component from the tractor component in the event of a predetermined turning movement or angular relation between such components such as might result in a "jackknife" condition of the vehicle. It will be understood that the manually insertable locking pin 46 is employed only for the purpose of rendering the automatic releasing mechanism ineffective when it is desired to purposely uncouple the tractor and trailer components, or when such components are being maneuvered or parked at relatively slow speeds wherein the angular relationship between the tractor and trailer components sometimes becomes relatively extreme. At the same time, the manually operable handle lever 28, associated with the crank shaft for the locking arms 29, provides a means whereby the coupling may be manually released or unlocked when it is desired to uncouple the components of the vehicle following parking thereof. Such manual uncoupling is effected merely by depressing the handle 28 in a counterclockwise direction as viewed in Fig. 1, to disengage the hook-like lugs 30 of the locking arms 29 from the outwardly projecting catches 31 of the relatively stationary coupling section 21. However, for normal highway operation, once the coupling has been locked about the king pin 13, the locking pin 46 is then removed from the openings 44 and 45 to permit the coupling to automatically release in the event that the trailer component assumes a predetermined dangerous angular position relative to the tractor component.

If so desired, the locking pin 46 may be replaced by any suitable equivalent means which might be remotely controlled from the cab of the tractor vehicle, thus permitting the operator of the vehicle to effect the locking or unlocking of the automatic releasing mechanism from his position in the operator's cab.

Also, while I have disclosed a single preferred form of the invention in the foregoing description and the accompanying drawings, it will be understood that this single form is susceptible to various modifications as to details of construction and design without departing from the spirit of the invention or the scope of the following claims.

I claim:

1. In a vehicle comprising tractor and trailer components; a coupling for releasably uniting said components comprising a slotted fifth wheel carried by one of said components; a king pin carried by the other of said components for turning movement within the slot of said fifth wheel; movable latch means carried in association with said fifth wheel and arranged normally to engage a king pin received in the slot of said fifth wheel to hold said king pin against withdrawal from said slot; and latch-releasing means carried in association with said fifth wheel and engageable with said latch means to automatically move the latter to a king pin-releasing position in response to the attainment of a given angular position of the trailer component relative to the tractor component of said vehicle.

2. A safety coupling for tractor-trailer vehicles of the type embodying a slotted fifth wheel carried by the tractor and a depending king pin carried by the trailer and rotatively received in the slot of said fifth wheel for uniting the tractor and trailer for relative turning movement, said coupling comprising two sections movable relatively to one another and arranged in one position of relative movement to rotatively engage the king pin of the trailer to lock the latter against withdrawal from the slot of said fifth wheel and in a second position of relative movement to disengage said king pin to permit the latter to be freely withdrawn from the slot of said fifth wheel; locking means connected between said relatively movable sections for locking said sections in said one position; and means engageable with said locking means and responsive to a predetermined relative turning movement between said tractor and trailer for automatically moving said sections to said other position to thereby release said king pin.

3. A safety coupling for tractor-trailer vehicles of the type having a slotted fifth wheel carried by the tractor; and a bearing plate and depending king pin carried by the trailer, the bearing plate of the trailer being arranged to be rotatively supported on said fifth wheel and the king pin being rotatively received within the slot of the fifth wheel, said coupling comprising a pair of sections pivotally connected with one another and arranged beneath said fifth wheel adjacent the slot thereof and being relatively movable to a first position defining a substantially closed socket about a king pin received in the slot of said fifth wheel, whereby to rotatively hold such king pin against withdrawal from the slot of the fifth wheel, and a second position releasing such king pin for free withdrawal from the slot of said fifth wheel; locking means connected between said sections and arranged normally to lock said sections in said first position; and lock-releasing means engageable with said locking means for automatically unlocking said sections in response to predetermined relative turning movement between the bearing plate of the trailer and the fifth wheel of the tractor.

4. A safety coupling as defined in claim 3, wherein said locking means comprises an arm pivotally connected at one end to one of said pair of sections and a relatively stationary catch carried on the other of said sections and normally engaging said arm when said sections occupy said first position; and said lock-releasing means comprises a passage formed in the fifth wheel and opening toward the bearing plate-receiving surface thereof; a slot formed in the bearing plate of the trailer and adapted to be brought into registry with the passage means of said fifth wheel upon said predetermined relative turning movement between the bearing plate and the fifth wheel; and spring-pressed lever means including a normally stationary dog carried in the passage of said fifth wheel and a bearing member adjacent said dog and bearing against the bearing plate of said trailer, said bearing member being movable into the slot of said bearing plate when the latter is brought into registry with the passage of the fifth wheel; and a cam carried by said spring-pressed lever means engageable with the arm of said locking means to disengage the latter from said catch upon movement of said bearing member into the slot of said bearing plate.

5. A safety coupling as defined in claim 3, including manually operable means engageable with said lock-releasing means to render the latter ineffective; and other manually operable means connected with said locking means for unlocking the latter independently of said lock-releasing means.

References Cited in the file of this patent

UNITED STATES PATENTS

| | | |
|---|---|---|
| Re. 20,837 | Armington | Aug. 30, 1938 |
| 2,454,626 | Borzell | Nov. 23, 1948 |
| 2,471,854 | Bies et al. | May 31, 1949 |